Sept. 16, 1930.  M. P. REYNOLDS  1,775,830
METHOD OF SEPARATING SOLIDS FROM LIQUIDS
Filed Jan. 7, 1927  5 Sheets-Sheet 3

INVENTOR.
Morley Punshon Reynolds
BY
ATTORNEYS.

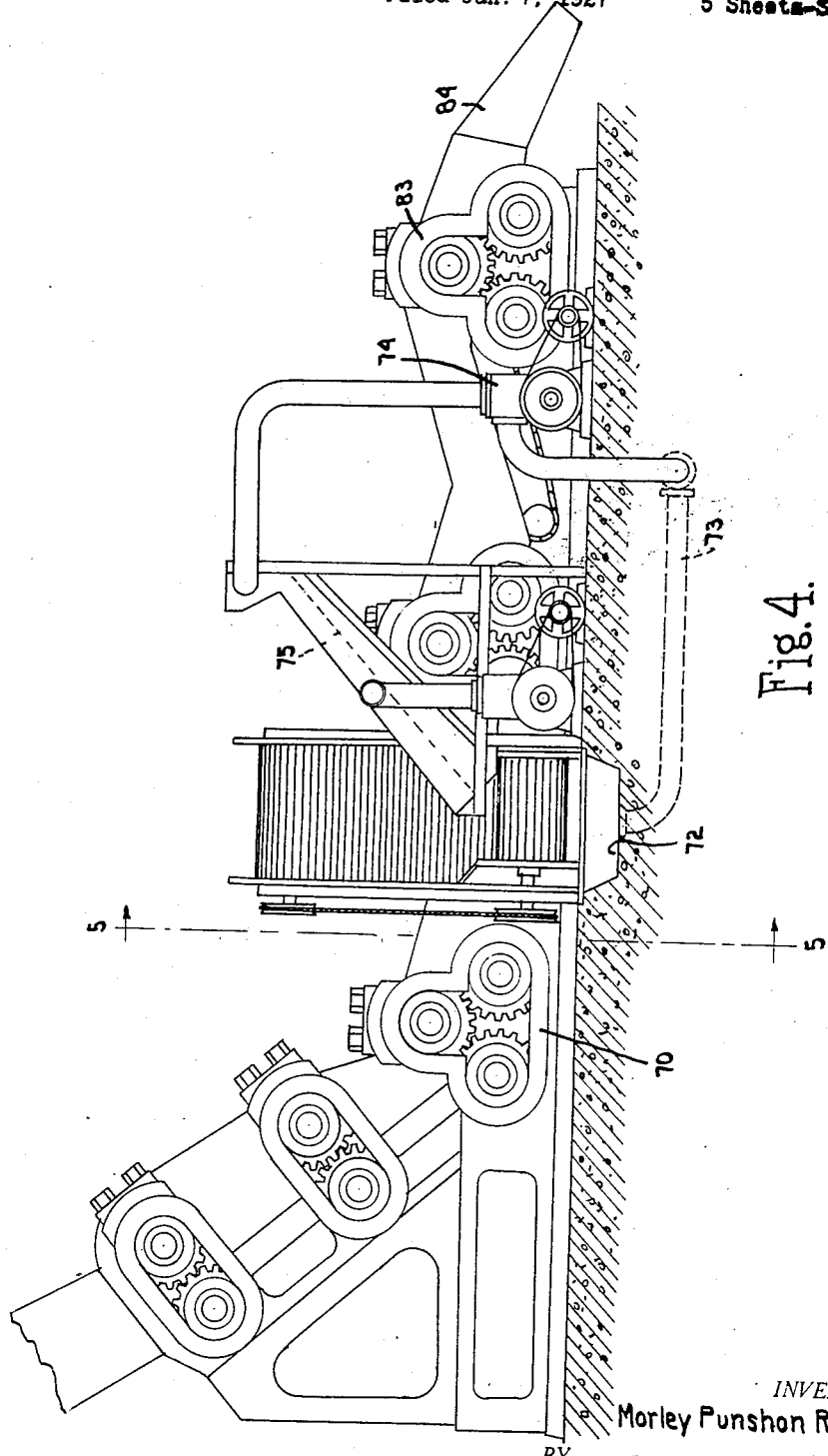

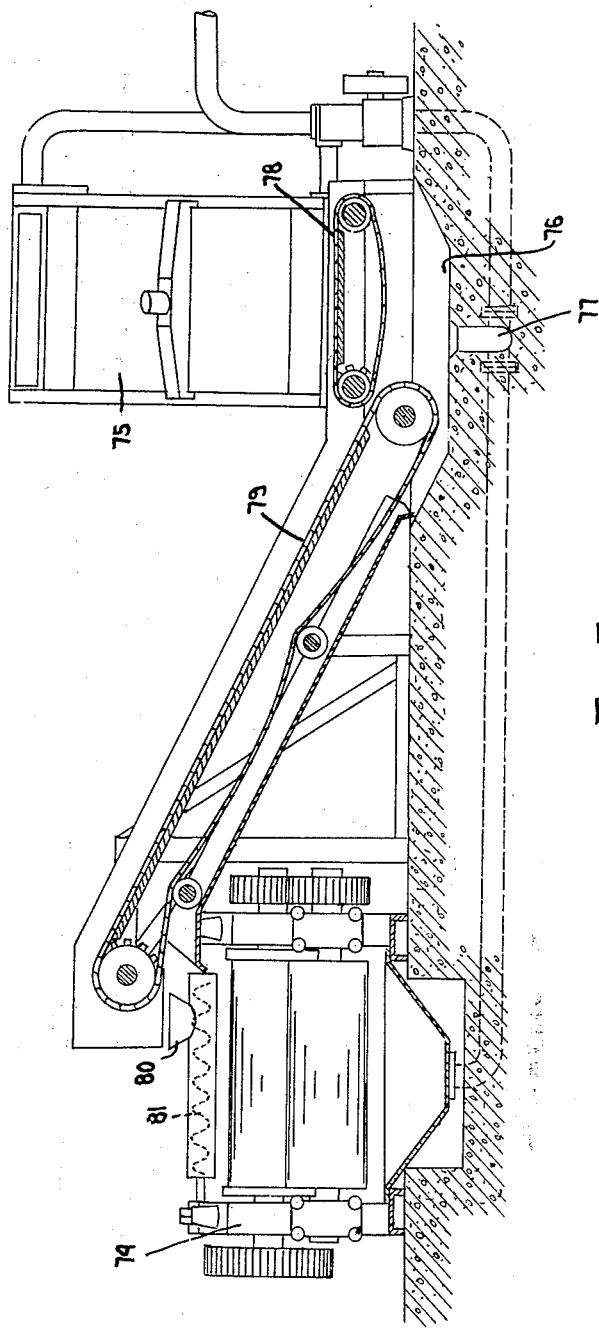

Patented Sept. 16, 1930

1,775,830

UNITED STATES PATENT OFFICE

MORLEY PUNSHON REYNOLDS, OF CLEVELAND HEIGHTS, OHIO, ASSIGNOR TO THE W. S. TYLER COMPANY, OF CLEVELAND, OHIO, A CORPORATION OF OHIO

METHOD OF SEPARATING SOLIDS FROM LIQUIDS

Application filed January 7, 1927. Serial No. 159,732.

The present invention, relating as indicated to methods of and apparatus for separating solids from liquids, is particularly directed to an improved method of handling the juices of fresh sugar cane and of removing the fibrous solid material from the juice. In the treatment of sugar cane to extract the sugar juices it has been a matter of extreme difficulty to entirely remove all of the small fibers of the cane from the juice except by tedious and expensive methods, and I have devised the present method and apparatus for rapidly and economically removing substantially all of the solid material from the juice without any expensive chemical or other treatment involving heat. In the ordinary cane crushing mill it is customary to provide a perforated plate or relatively very coarse screen in the troughs into which the raw juice drains for effecting a straining of the juice, but as this is extremely ineffective in removing any high percentage of the fibrous material carried in suspension in the juice other means, such as fixed screens or rotating or shaking screens, have been interposed in the process at one point or another, but up to the present time without effecting any important economies in the process. The objection to all the methods attempted up to this time comes from the sticky colloidal matter which issues from the juice in the cane stalks and which is carried along with the juice. This matter is adhesive and lends itself to the clogging of the holes in the perforated plates and the meshes in even coarse screens and, together with the fibrous material, rapidly builds up a coating around the openings, which reduces the mesh and eventually blinds or clogs the screen.

The present method and apparatus have been developed with a view to preventing this clogging of the screen in the manner, and by the steps and means hereinafter described.

To the accomplishment of the foregoing and related ends, said invention, then, consists of the means hereinafter fully described and particularly pointed out in the claim; the annexed drawing and the following description setting forth in detail certain means and one mode of carrying out the invention, such disclosed means and mode illustrating, however, but one of various ways in which the principle of the invention may be used.

Figure 1:
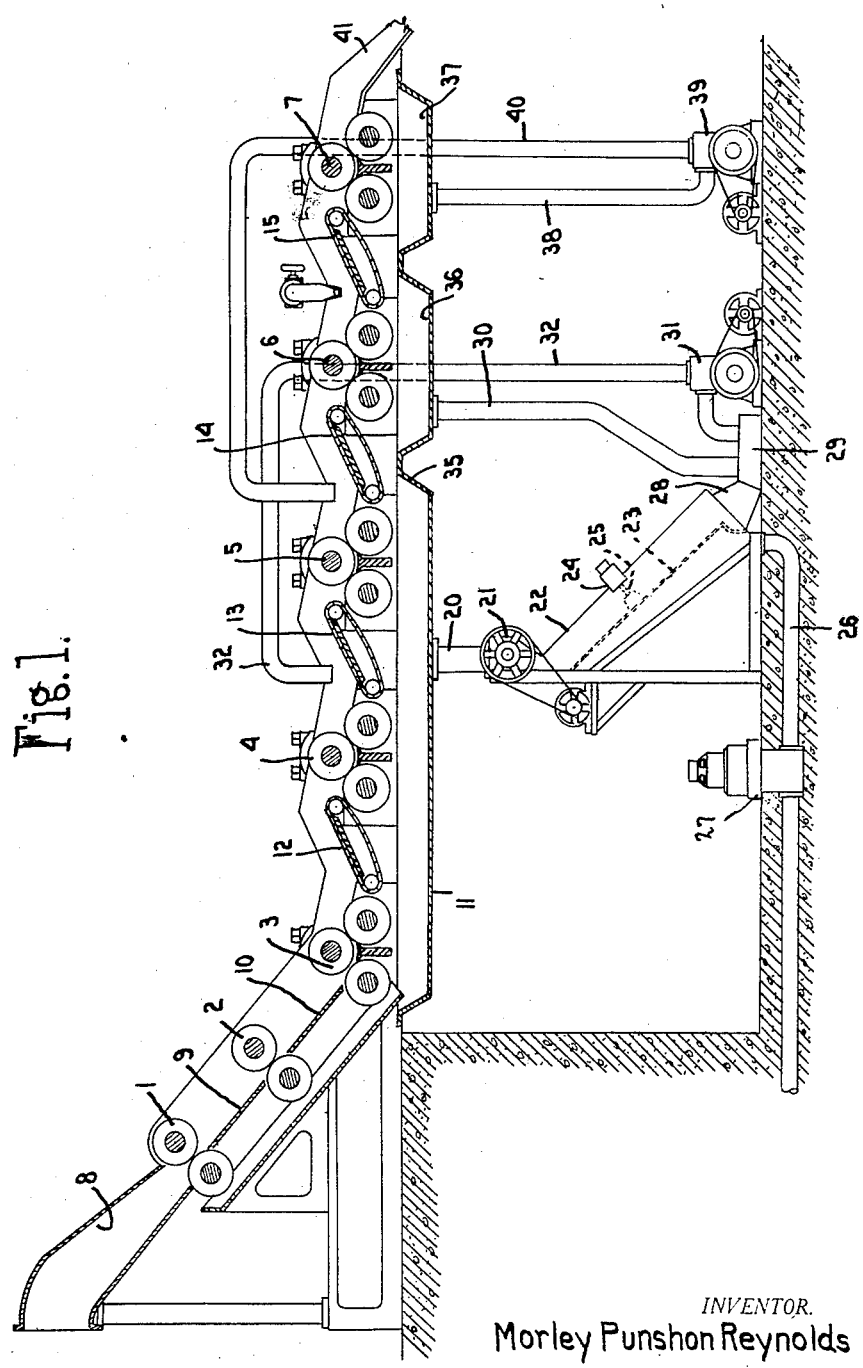
Figure 2:
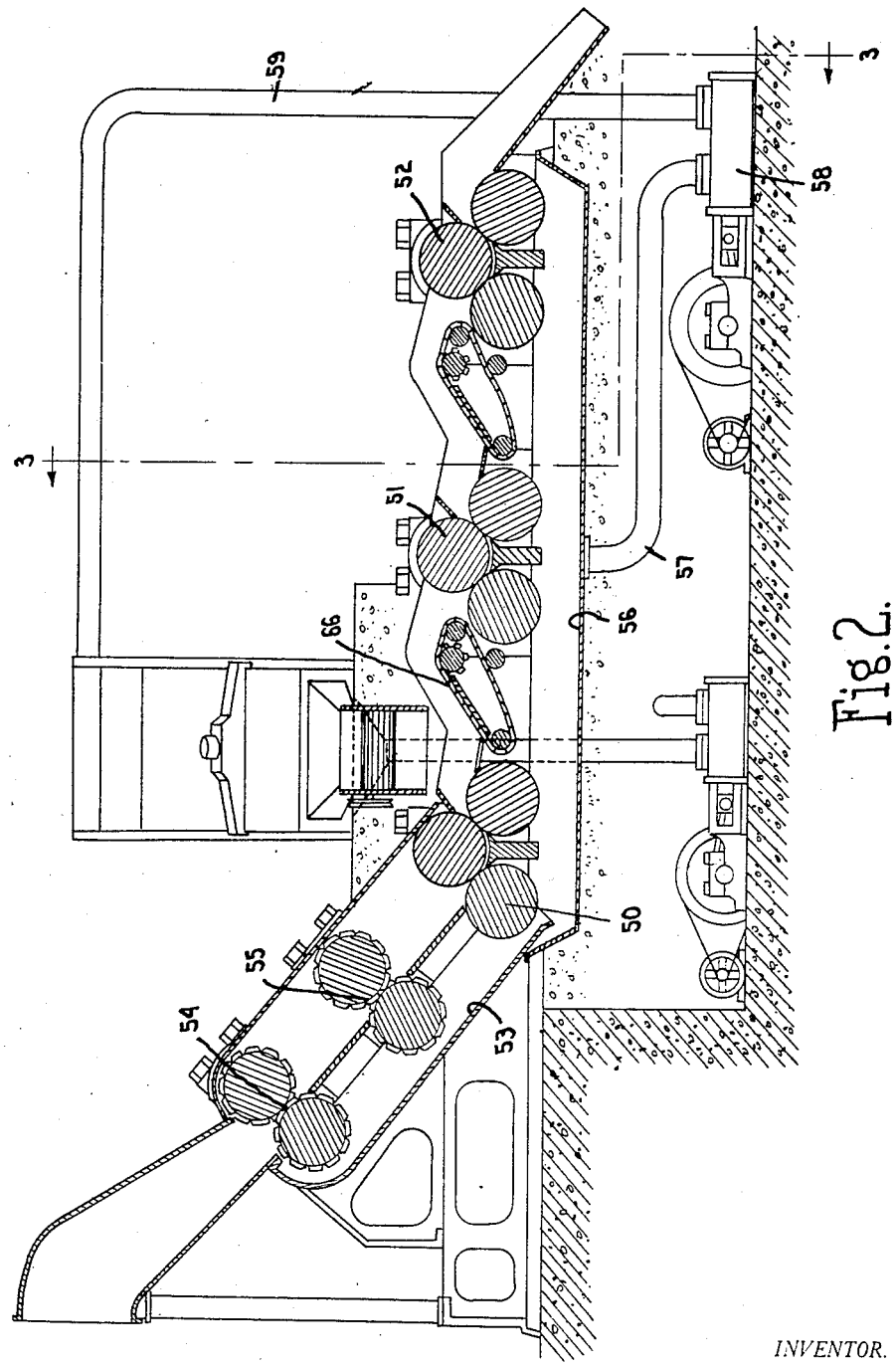
Figure 3:
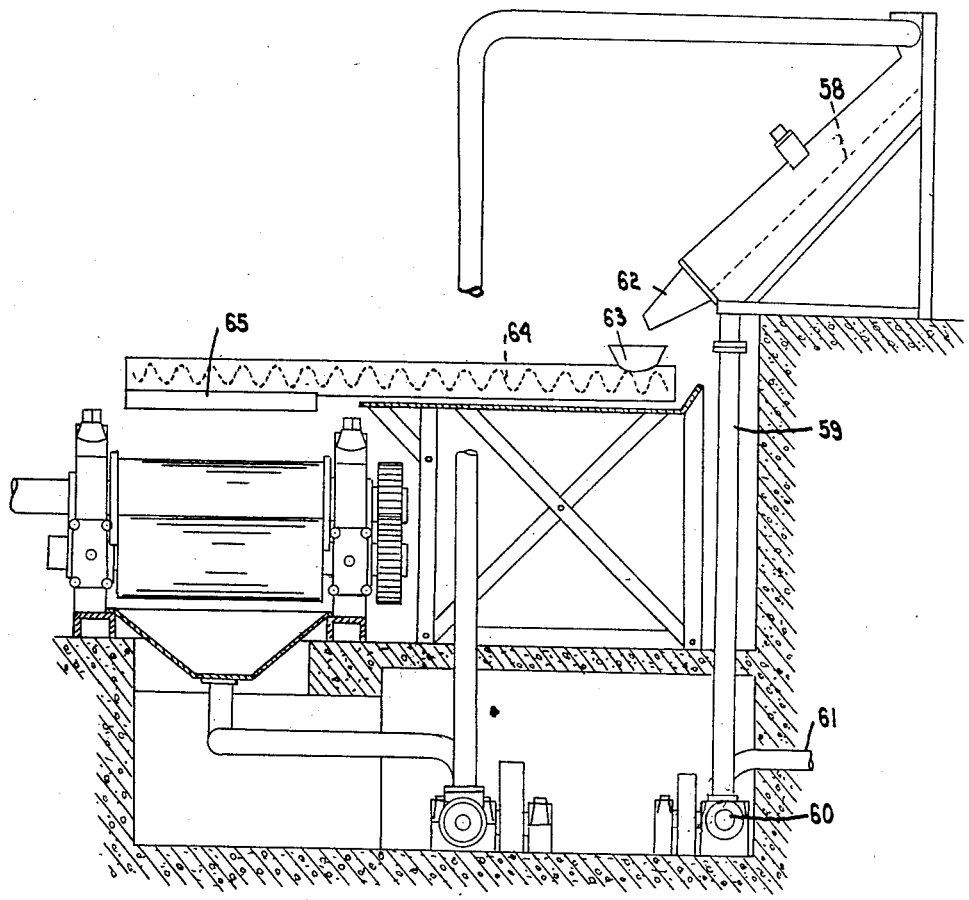

In said annexed drawings:

Fig. 1 is a side elevation partially in section showing one form of sugar mill with which I have combined certain apparatus to carry out effectively the method of treatment which I have devised; Fig. 2 is a similar view showing a similar type of mill combined with similar additional apparatus which is shown in Fig. 1 in a different manner to also carry out my improved method; Fig. 3 is a section on the line 3—3 in Fig. 2; Fig. 4 is a side elevation partially in section of a sugar mill showing still another form of apparatus for the purpose referred to; and Fig. 5 is a section on the line 5—5 in Fig. 4.

Referring now to Fig. 1, there is shown a typical apparatus for treating sugar consisting of a series of crushing rolls 1, 2, 3, 4, 5, 6, and 7 mounted in suitable housings and driven in unison by any suitable power means (not shown). Of these crushing rolls the first three sets, Nos. 1, 2 and 3, are mounted in inclined relation and a feed chute 8 is arranged to discharge sugar cane between the rolls of the first set 1. These rolls partially crush the cane, which is then discharged onto a chute 9 and introduced to the second set 2, from which the cane in a still more crushed condition is passed on to a second chute 10 and carried to the first set of the crushing rolls 3.

Extending beneath the sets of rolls 3, 4, 5, 6, and 7 is a trough 11 adapted to catch and collect the sugar juice as it drains down from the crushing rolls, the solid material being discharged from the first set of rolls 3 onto an inclined endless belt conveyor 12, which carries the solid material to the next set of rolls 4. From each set of rolls the sugar juice drains down into the trough 11 and the solid material is carried to the next rolls by means of other belt conveyors 13, 14 and 15.

The action of the crushing rolls is to squeeze and compress the stalks of sugar cane and to press out the juice. The nature of the cane is such that many small particles of fibrous matter which is separated from the cane stalks by the crushing are carried out by the juice which drains away and contaminate this juice, and in the aggregate form a very considerable amount of solid material therein. It is highly desirable to remove this solid fibrous material in the mill and during the crushing operations. The method and apparatus which I have devised for accomplishing this are as follows.

I take the juice from the trough 11 and discharge it onto the upper end of an inclined vibrating screen contained in a suitable housing 22. The screen 23 in this housing is rapidly vibrated by means of an electro-magnetic device 24, the armature 25 of which is secured to the screen and is caused to vibrate the latter at an extremely high speed. The electro-magnetically operated screen and the combination of screen and electro-magnet operating the same are fully described in my prior Patent No. 1,597,826 and hence need not be described in detail. The fineness of the screen will depend upon various conditions, but would ordinarily be between 40 and 150 mesh. The pure juice which passes through the screen is discharged through a conduit 26, in which is interposed a pump 27, and is then carried to any suitable storage reservoir for further treatment.

The solid fibrous material which does not pass through the screen is discharged over the screen through a chute 28 into a chamber 29. The juice which drains from the fourth set of rolls 6 is discharged from the trough 11 through a conduit 30 which leads to the chamber 29 and this juice acts to flush the solid material discharged into this chamber from the screen through a pump 31 and conduit 32, from which it is discharged onto the conveyor 13 between the second and third sets of rolls.

Some of the solid material which is then returned to the mill at this point drains down with the juice and is again passed over the screen 23, while the remainder of the solid material is discharged into the rolls 5 and thus passes through the two final sets of rolls. The fine fibers when returned to the system on the conveyor 13 adhere to the stalks and continue through the system as waste and are thus disposed of.

The trough 11 is broken up into any convenient number of compartments, one arrangement of three being shown, the first compartment terminating just beyond the set of rolls 5 at a partition 35, the second compartment 36 terminating just beyond the rolls 6, and the third compartment 37 lying directly beneath the last set of rolls 7. The passage of the juice which drains into the second chamber 36 has already been described. The juice and such fibrous material as is contained in it which drains into the final chamber 37 is carried into a conduit 38, to a pump 39 and conduit 40, and is then returned onto the conveyor 14 and again passed through the last two sets of rolls 6 and 7, or at least most of the fibrous material is passed through these sets of rolls because of its adherence to the stalks, the great bulk of the juice again draining off into the second chamber 36, from which it is returned through the conduit 32, as already described. The solid material issuing from the last set of rolls 7 is discharged as waste through a chute 41.

By thus removing from the system the juice as it is formed and separating from the juice the solid matter and then returning the juice, together with the solid matter, to the system for further crushing it is possible to remove substantially all of the juice from even the fine particles of fibrous solid matter and at the same time to separate from the juice which is finally removed from the system practically all of the solid matter which ordinarily remains in the juice and becomes a source of further expense and difficulty in the subsequent treatment of the juices.

In Fig. 2 I have shown a modification of the apparatus just described in which there are three sets of crushing rolls 50, 51, and 52, to which the material is fed through a conduit 53, in which are preliminary rolls 54 and 55. Beneath the crushing rolls 50, 51 and 52 is a trough 56, into which all of the juice extracted from the cane in the three sets of crushing rolls drains, and from which it is removed through a conduit 57, leading to a pump 58. From this pump all of the juice is passed to an inclined electro-magnetically vibrated screen 58. From this screen the juice, which of course passes through the screen, is removed by a conduit 59, pump 60 and a second conduit 61 to a suitable reservoir. The oversize material, that is, the solid material which does not pass through the screen, is discharged through a chute 62 into a feeding trough 63 and then into a spiral conveyor 64, by means of which it is carried transversely across the mill and discharged through a slot 65 under the lower end of the conveyor 66, which is between rolls 50 and 51. This solid material is then carried by this conveyor to the next set of rolls and in company with the main supply of crushed cane is passed through the last two sets of rolls again.

In Figs. 4 and 5 I have shown a further modification of the system, in which only the juice draining off from the first and second set of crushing rolls 70 and 71 is carried into a trough 72, then separated from the solid matter by being passed through the screen and the juice returned to the system. In this type of apparatus the juice drained from the first two sets of crushing rolls into the trough 72 is carried through a conduit 73 to a pump 74 and then passed to an inclined electromagnetically vibrated screen 75, from which the juice is received in a trough 76 and pumped away to suitable reservoirs through a conduit 77, while the solid material is discharged from the screen onto a conveyor 78, which in turn discharges it onto an inclined conveyor 79, which, at its upper end, discharges the solid material through a feeding trough 80 into a spiral conveyor 81 which distributes it uniformly across the path of the mill in front of the second set of rolls 71. The solid material is then re-crushed in this set of rolls and in the succeeding sets, the juice being drained off from the various later sets of rolls in any suitable way, and the solid material being discharged from the last set of rolls 83 through a chute 84.

I have found it possible by employing a vibratory screen, that is one which is constantly and very rapidly vibrated and jarred, to keep the mesh of the screen free from clogging and to shake loose the deposit of fine fibrous material and sticky colloidal material which has caused so much difficulty in straining raw juice by all other methods. The advantages of the present system are a very considerable saving in cost, a much more complete separation of the solid material, since practically all of the fibrous material can be be removed by the present method. The more accurate and complete removal of the solid material is due to the fact that very much finer mesh screens may be used without any danger of clogging because of the vibration imparted to the screen and the constant breaking loose of any deposited material before it has a chance to build up around the meshes of the screen and clog these meshes.

All of the various forms of apparatus which have been described serve the same purpose, namely, to remove from the system part or all of the juice, purify this juice of its solid material and then return the solid material to the mill for the double purpose of removing from this material the adhering juice and pressing out of the material any further confined juice, with the result that the juice extracted from the cane in the mill is in a substantially pure condition and the solid fibrous material discharged from the mill is as free from juice as possible. The advantage of returning the fibrous material which is removed from the raw juice, together with some or all of the juice, to the system is that by returning this material onto one of the intermediate conveyors between the sets of crushing rolls the juice, together with the fibrous and colloidal material is discharged directly onto the cane stalks which are being passed from one set of rolls to the next, and the fibrous material is thus permitted to adhere to the cane stalks and be carried through the succeeding operations without being washed out by the juice. It will be understood that after the first crushing operation the stalks are in a pulpy condition and most of the juice has been extracted so that the subsequent crushing operations do not produce as much juice as does the first, and if the fibrous material is introduced among the cane stalks it is at this point very liable to remain with these stalks and not be washed out with the juice as it is after the first crushing operation.

Other modes of applying the principle of my invention may be employed instead of the one explained, change being made as regards the means and the steps herein disclosed, provided those stated by the following claim or its equivalent be employed.

I therefore particularly point out and distinctly claim as my invention:—

In a method of treating liquid-containing solids to extract the liquid therefrom, the steps which consist in subjecting the solids to a crushing action, extracting some of the liquid, subjecting such extracted liquid and its contained solids to the action of a constant vibratory screening operation to separate the solid material contained therein, and then re-crushing such removed solid material.

Signed by me, this 4th day of January, 1927.

MORLEY PUNSHON REYNOLDS.